(12) United States Patent
Okhotnikov et al.

(10) Patent No.: US 8,179,943 B2
(45) Date of Patent: May 15, 2012

(54) SEMICONDUCTOR SATURABLE ABSORBER REFLECTOR AND METHOD TO FABRICATE THEREOF

(75) Inventors: Oleg Okhotnikov, Tampere (FI); Mircea Guina, Tampere (FI); Anatoly B. Grudinin, Southampton (GB)

(73) Assignee: Reflekron Ltd., Tampere (FI)

( * ) Notice: Subject to any disclaimer, the term of this patent is extended or adjusted under 35 U.S.C. 154(b) by 245 days.

(21) Appl. No.: 11/918,043

(22) PCT Filed: Apr. 6, 2005

(86) PCT No.: PCT/FI2005/050111
§ 371 (c)(1),
(2), (4) Date: Feb. 19, 2009

(87) PCT Pub. No.: WO2006/106170
PCT Pub. Date: Oct. 12, 2006

(65) Prior Publication Data
US 2009/0296767 A1 Dec. 3, 2009

(51) Int. Cl.
*H01S 5/00* (2006.01)
(52) U.S. Cl. ............................... 372/45.013; 372/45.011
(58) Field of Classification Search ............. 372/45.013, 372/45.011
See application file for complete search history.

(56) References Cited

U.S. PATENT DOCUMENTS

| | | | |
|---|---|---|---|
| 4,860,296 A | 8/1989 | Chemla et al. | |
| 5,627,854 A | 5/1997 | Knox | |
| 5,701,327 A * | 12/1997 | Cunningham et al. | 372/99 |
| 6,538,298 B1 * | 3/2003 | Weingarten et al. | 257/436 |
| 7,088,756 B2 * | 8/2006 | Fermann et al. | 372/45.013 |
| 2002/0072140 A1 * | 6/2002 | Finder et al. | 438/30 |

OTHER PUBLICATIONS

PCT/ISA/210—International Search Report—Dec. 7, 2005.
H. Q. Zheng et al.; Metamorphic InP/InGaAs double-heterojunction bipolar transistors on GaAs grown by molecular-beam epitaxy; Applied Physics Letters; vol. 77, No. 6, Aug. 7, 2000; pp. 869-871.
A. G. Dentai et al; MOVPE InGaAs/InP Grown Directly on GaAs Substates; Electronics Letters, vol. 22, No. 22.; Oct. 23, 1986; pp. 1186-1188.
E. Lugagne Delpon et al; Ultrafast excitonic saturable absorption in ion-implanted InGaAs/InAlAs multiple quantum wells; Applied Physics Letters, vol. 72, No. 7, Feb. 16, 1998; pp. 759-761.
J. T. Gopinath et al; Ultrafast recovery times in implanted semiconductor saturable absorber mirrors at 1.5 μm; in Proc. CLEO, 2001, pp. 698-700.
Li Qian et al.; Subpicosecond carrier lifetime in beryllium-doped InGaAsP grown by He-plasma-assisted molecular beam epitaxy; Appl. Phys. Lett., vol. 17; pp. 1513-1515; 1997 (reprinted in Wednesday Morning/QELS '97).

(Continued)

*Primary Examiner* — Kinam Park
(74) *Attorney, Agent, or Firm* — Peter J. Rainville; Nicholas J. Tuccillo

(57) ABSTRACT

A design of a semiconductor saturable absorber that offers a convenient and reliable way to control/decrease the recovery time of the absorption. The absorption recovery time is controlled during the epitaxial growth by using lattice-mismatched layer(s) to induce dislocations, and implicitly non-radiative recombination centers within the nonlinear absorbing region. These lattice reformation layer(s) are interposed between the distributed Bragg reflector and the nonlinear absorption region, containing quantum-wells, quantum-dots or bulk semiconductor material. The thickness and composition of the lattice reformation layer(s) is an instrumental to control the amount of non-radiative recombination centers used to trap the optically excited carriers generated in the absorption region.

27 Claims, 6 Drawing Sheets

OTHER PUBLICATIONS

Shantanu Gupta et al; Ultrafast Carrier Dynamics in III-V Semiconductors Grown by Molecular-Beam Epitaxy at Very Low Substrate Temperatures; IEEE Journal of Quantum Electronics, vol. 28, No. 10, Oct. 1992; pp. 2464-2472.

Robert Herda et al; Effect of amplified spontaneous emission and absorber mirror recovery time on the dynamics of mode-locked fiber lasers; Applied Physics Letters 86, 2005; pp. 011113-011113-3.

S. Gray et al.; Soliton fiber laser with a hybrid saturable absorber; Optics Letters, vol. 21, No. 3; Feb. 1, 1996; pp. 207-209.

M. Guina et al.; Harmonic mode locking by synchronous optical pumping of a saturable absorber with the residual pump; Optics Letters, vol. 28, No. 5, Mar. 1, 2003; pp. 358-360.

J. F. Hefferman et al; All optical, high contrast absorptive modulation in an asymmetric Fabry-Perot étalon; Appl. Phys. Lett. 58 (25), Jun. 24, 1991; pp. 2877-2879.

Brandon C. Collings et al; Short Cavity Erbium/Ytterbium Fiber Lasers Mode-Locked with a Saturable Bragg Reflector; IEEE Journal of Selected Topics in Quantum Electronics, vol. 3, No. 4, Aug. 1997; pp. 1065-1075.

F. X. Kärtner et al; Soliton Mode-Locking with Saturable Absorbers; IEEE Journal of Selected Topics in Quantum Electronics, vol. 2, No. 3, Sep. 1996; pp. 540-556.

European Patent Office Communication, dated Mar. 24, 2009, issued in connection with counterpart European Application No. 05 717 351.0.

S.N. Tandon, et al., "Large-area broadband saturable Bragg reflectors by use of oxidized AlAs," *Optics Letters,* vol. 29, No. 21, pp. 2551-2553 (Nov. 1, 2004).

Okhotnikov et al., "Ultra-fast Fibre Laser Systems Based on SESAM Technology: New Horizons and Applications", New Journal of Physics 6 (2004) 177.

* cited by examiner

SEMICONDUCTOR SATURABLE ABSORBER REFLECTOR AND METHOD TO FABRICATE THEREOF

FIELD OF THE INVENTION

The present invention relates generally to semiconductor devices comprising saturable absorbers, and in particular to a concept to reduce the recovery time of absorption, a method to fabricate thereof, and the use of such a device in mode-lock lasers. The method also relates to a method for manufacturing a semiconductor device comprising forming a distributed Bragg reflector layer on a semiconductor substrate, forming an absorption region, and forming a cap layer on the absorption region. The method further relates to a laser comprising a gain medium, means to pump the gain medium, a mirror, one or more dispersion compensating elements, and a semiconductor device comprising a semiconductor substrate, a distributed Bragg reflector layer, an absorption region, and a cap layer.

BACKGROUND OF THE INVENTION

Semiconductor saturable absorbers are nonlinear optical elements that impose an intensity-dependent attenuation on a light beam incident upon it; an incident radiation of low intensity is preferably absorbed, while a high intensity radiation passes the saturable absorber with much less attenuation. For practicality, a semiconductor saturable absorber is usually integrated with a semiconductor, dielectric or metallic mirror forming a semiconductor saturable absorber mirror (SESAM). These devices have found applications in a large variety of fields. In particular, passive mode-locking based on semiconductor saturable absorber is a powerful technique to produce short optical pulses in simple laser cavities. Ultra short optical pulses have been produced with this technique using different SESAM designs. See for example the works published by F. X. Kärtner et al., IEEE J. Sel. Top. Quantum Electron., vol. 2, pp. 540-556, 1996, and B. C. Collings et al., IEEE J. Sel. Topics Quantum Electron, vol. 3, pp. 1065-1075, 1997 or U.S. Pat. No. 5,627,854 to Knox.

A SESAM comprises semiconductor material(s) whose energy band-gap is small enough to absorb an optical signal to be controlled, see for example U.S. Pat. No. 4,860,296 to Chemla et al. The absorbing material is usually embedded within semiconductor material(s) with a higher band-gap(s) that do not absorb the optical signal. The thickness of a single absorbing layer is typically in the range of few nanometers so that quantum-mechanical effects are enabled (in this case the absorbing layers are called quantum-wells, QWs). The whole absorber region may comprise a number of quantum-well layers representing the so-called multiple-quantum-wells structure. Additional design features can include positioning of the nonlinear absorbing layer within a Fabry-Perot cavity as well as means to apply an electrical field to the structure for the purpose of controlling its absorption properties, as shown by Heffernan et al. in Appl. Phys. Lett., vol. 58, pp. 2877-2879, 1991. Alternatively, an external optical source that provides a control beam can be used to vary the optical properties of the saturable absorber whereas the control beam can also be absorbed in the material surrounding the saturable absorber as for example is shown by M. Guina et al. in Opt. Lett., 28, pp. 43-45, 2003.

It can be gathered from the prior art that SESAMs are generally formed by utilizing compound semiconductor layers with similar lattice constants, i.e. small lattice mismatch, or the thickness of the lattice mismatched layers is kept below a critical thickness to ensure a high quality of the crystalline structure. The recovery time of high-quality lattice-matched SESAMs is in the nanoseconds range, as shown for example by Gray et al., Opt. Lett., vol. 21, pp. 207-209, 1996. However, for many applications, the saturable absorption should recover to its initial value in a much shorter time. In particular, for efficient and self-starting mode-locking, the recovery time should attain a value in the range of few picoseconds to few tens of ps, depending on the gain medium and laser cavity, as shown for example by R. Herda and O. G. Okhotnikov, Appl. Phys. Lett., vol. 86, pp. 01111-1-01111-3, 2005. To reduce the recovery time to suitable values, the fabrication process of SESAMs includes special techniques such as *low-temperature growth*, as shown by Gupta et al., IEEE J. Select. Topics Quantum Electron., vol. 10, pp. 2464-2472, 1992, *Be-doping*, for example shown by Qian et al., Appl. Phys. Lett., vol. 17, pp. 1513-1515, 1997, proton bombardment, see for example Gopinath, et al., Proceedings CLEO, 2001, pp. 698-700, and ion bombardment, as shown by Delpon et al., Appl. Phys. Lett., vol. 72, pp. 759-761, 1998. Each of these techniques brings in different drawbacks, including an increased complexity of the fabrication process and may result in certain degradation of the SESAM parameters.

Combining semiconductor materials with large lattice mismatch, i.e. metamorphic structures, increases the degree of freedom in fabricating integrated semiconductor devices. In particular, for SESAMs it would be attractive to combine $In_xGa_{1-x}As$ absorbing regions, which are optically active at 1550 nm ($x \geq 0.53$), with high-quality and easy to fabricate GaAs-based distributed Bragg reflectors (DBRs). The lattice constants of these two material systems are significantly different giving raise to formation of defects that ultimately deteriorate the optical properties of the device. In order to reduce the amount of defects arising during the growth of such a structure, several approaches have been proposed.

According to a first approach, suggested by K. Weingarten et al. in U.S. Pat. No. 6,538,298 B1, a so called resonant design is employed to enhance nonlinear effects and thus enable to obtain a desired nonlinear effect by using very thin $In_xGa_{1-x}As$ active region absorbing 1550-nm radiation that is grown lattice-mismatched directly on GaAs-based DBR. The thickness of $In_xGa_{1-x}As$ should not exceed a critical thickness of about 5 nm. It was also suggested that by growing active regions that are 2 nm thicker than the relaxation thickness, certain number of dislocation defects are created leading to a reduction of the absorption recovery time. However, due to very thin active region, the nonlinear reflectivity cannot exceed 1.2-2.5%, a value that is too low for many applications.

According to a second approach, an InP buffer layer with a thickness of about 1-1.5 µm should be grown between the GaAs and the InGaAs active region, as for example demonstrated by A. G. Dentai et al., Electron. Lett. 22, 1186 (1986) or H. Q. Zheng et al., Appl. Phys. Lett., 77, pp. 869-871 (2000). This method has been used for the monolithic growth of 1550 nm SESAMs on GaAs substrate as presented by J. E. Cunningham et al. in U.S. Pat. No. 5,701,327. The aforementioned patent presents a standard fabrication method (included also in the previous references) employing multistep epitaxy for the growth of the InP buffer to limit the penetration of the dislocation defects formed at the GaAs/InP interface into the active region deposited on the top of the structure. A first part of the buffer is grown at lower temperature then the subsequent one, i.e. about 400° C., resulting in a confinement of the dislocations inside the first part of the buffer and thus avoiding their propagation into the upper layers. It was also suggested that the interface defects may act as recombination sources and thus decrease the recovery time of the absorption. Those skilled in the art would recognize that before being trapped by the interface defects the photo-carriers generated within the active region would have to propagate towards the interface. This process impose certain limitation on the applicability of the method to control the recovery time of absorption; for example, if a high number of quantum-wells are employed the carriers generated at the proximity of the InP/GaAs interface will be preferentially trapped than those generated within the quantum-wells that are located far from the interface. One could expect that this method to reduce the recovery time is efficient only for a thin active region situated very close, i.e. within 50 nm, from the InP/GaAs interface.

SUMMARY OF THE INVENTION

According to this invention, the absorption recovery time is controlled during the epitaxial growth by using lattice-mismatched layer(s) to induce dislocations, i.e. misfit and threading dislocations, and implicitly non-radiative recombination centers within the nonlinear absorbing region. A very important feature of the invention consist in a relaxation of the design constrains for the active region; the thickness of the active region can be largely varied while the number of the dislocations can be accurately modified during the fabrication. The general architecture of the device comprises a distributed Bragg reflector (DBR) lattice matched to a semiconductor substrate, lattice reformation layer(s), the nonlinear absorption region, containing quantum-wells, quantum-dots or bulk semiconductor material, and a cap layer. Depending on the design approach, i.e. operation wavelength and choice of material, the nonlinear layer is either lattice-matched or lattice-mismatched to the substrate and the DBR material. The lattice reformation layer(s) grown between DBR and the absorber is an instrumental to control the amount of dislocations and implicitly the amount of non-radiative recombination centers used to trap the optically excited carriers generated in the absorption region.

The choice of the lattice-reformation layer(s) is governed by one of the following two general cases. If the nonlinear layer and the DBR material are largely mismatched then the number of defects in the nonlinear region could be very high eventually resulting in relaxation of the crystalline structure in the absorbing region. In this case, a lattice reformation layer is grown prior to nonlinear region to relief the strain. Thus the crystalline quality of the nonlinear region is improved and the number of defects is decreased. As it will become clearer in the detailed description of the invention, the thinner the reformation layer is, more defects are formed within the active region.

If the lattice-mismatch parameter between the nonlinear absorbing layer(s) and the DBR is very small or zero, the lattice reformation layer is engineered to introduce a certain lattice mismatch and thus provide fast carrier recombination centers, for example through misfit and/or threading dislocations, within the nonlinear region. In other words, the lattice reformation layer controls the density of the non-radiative centers in the absorber region. These general concepts can be applied to a large variety of semiconductor material systems with low and large lattice mismatches.

To put it more precisely, the semiconductor device according to the present invention is primarily characterized in that the semiconductor device further comprises a lattice reformation layer between the distributed Bragg reflector and the nonlinear absorption region. The lattice parameter and thickness of the lattice reformation layer(s) have values that should be optimized to achieve desirable characteristics of the device, particularly, the recovery time of the absorption.

To put it more precisely, the semiconductor device according to an example embodiment of the present invention is primarily characterized in that the distributed Bragg reflector layer is lattice matched to the semiconductor substrate. The purpose of this is to ensure low-loss high-reflective performance of the reflector.

To put it more precisely, the semiconductor device according to yet another example embodiment of the present invention is primarily characterized in that at least one layer, with a band gap small enough to absorb an incoming signal, is formed on the lattice reformation layer with the purpose of achieving saturable absorption at the signal wavelength. Depending on the lattice mismatch between the semiconductor materials comprising the device, a certain number of dislocations are propagated or created through the lattice reformation layer and nonlinear layer with the aim of introducing non-radiative recombination centers within the nonlinear layer.

To put it more precisely, the method according to an example embodiment of the present invention is primarily characterized in that the method further comprises forming a lattice reformation layer between the distributed Bragg reflector layer and the nonlinear absorption region.

To put it more precisely the absorption recovery time can be controlled by changing the thickness of the lattice reformation layers(s) and/or the composition of the layer(s).

To put it more precisely, the laser according to the present invention is primarily characterized in that the semiconductor device of the laser further comprises a lattice reformation layer between the distributed Bragg reflector layer and the nonlinear absorption region.

The proposed device has an advantage of flexibility in using semiconductor substrates. Particularly, long-wavelength saturable absorbers can be grown on GaAs substrates.

BRIEF DESCRIPTION OF THE DRAWINGS

A complete understanding of the invention is provided by the description of the specific illustrative embodiments and the corresponding drawings in which.

DETAILED DESCRIPTION OF THE INVENTION

Figure 1:
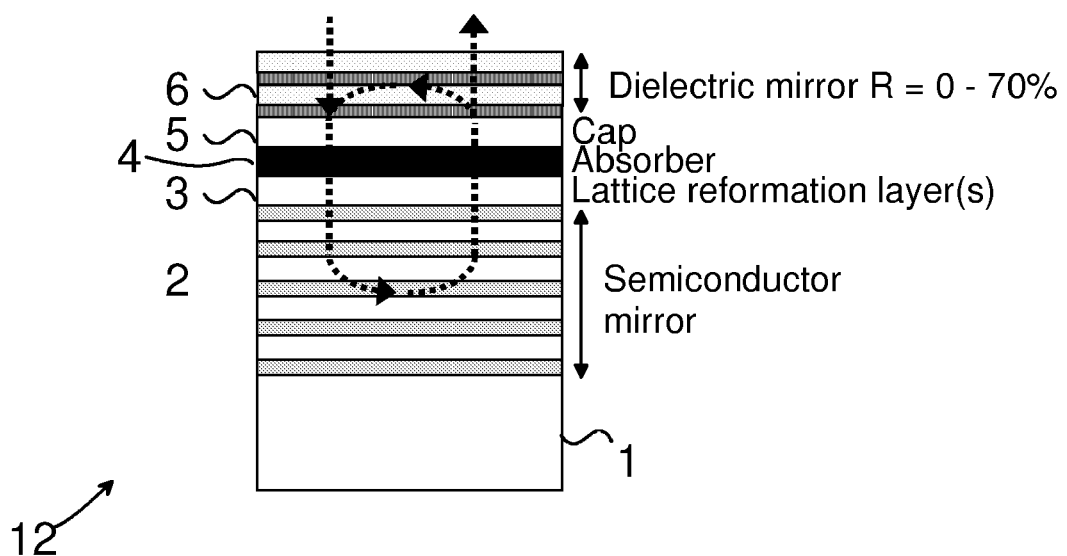
FIG. 1 shows a cross-section description of a general structure of a semiconductor saturable absorber mirror designed according to this invention.

With reference to FIG. 1, the general structure of a semiconductor saturable absorber designed according to this invention includes a semiconductor substrate 1, for example GaAs or InP, suitable for growing high quality compound semiconductors with alternate high and low refractive indices to form the distributed Bragg reflector 2. The DBR layers have thicknesses of a quarter of the optical wavelength at which the DBR is designed to have a maximum reflection. Reflectivity can be adjusted by changing the number of constituting layers. The lattice reformation section 3 comprises semiconductor layer(s) with a lattice constant different from that of the DBR layers to manage the process of generating defects in the crystalline structure. The device includes the absorbing multi-layers region 4 comprising layer(s) with energy band-gap small enough to absorb an optical signal and provide a nonlinear interaction with the signal. Depending on the operating wavelength and other desired features, the nonlinear absorbing region 4 can either be lattice-matched or lattice mismatched to the reformation layer 3. In any case it is assumed that the defects are created within the lattice reformation layer(s) 3 and/or at the interface between the lattice reformation layer(s) and the nonlinear layer and these defects are migrating and penetrate into the absorbing region 4, thus reducing the absorption recovery time. Additional compound semiconductors 5 are placed above the absorbing region 4 to control the thickness of the Fabry-Perot cavity defined by the DBR mirror and the top surface of the device. The structure can be terminated by depositing dielectric mirrors 6 with a required reflectivity to adjust the optical properties of the device.

Figure 2:
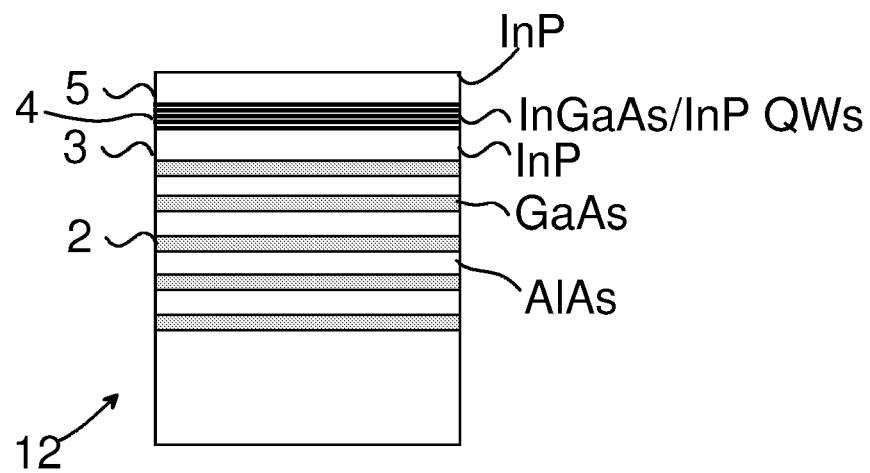
FIG. 2 is a cross-section of a semiconductor saturable absorber mirror described as a first embodiment of the invention.
Figure 3:
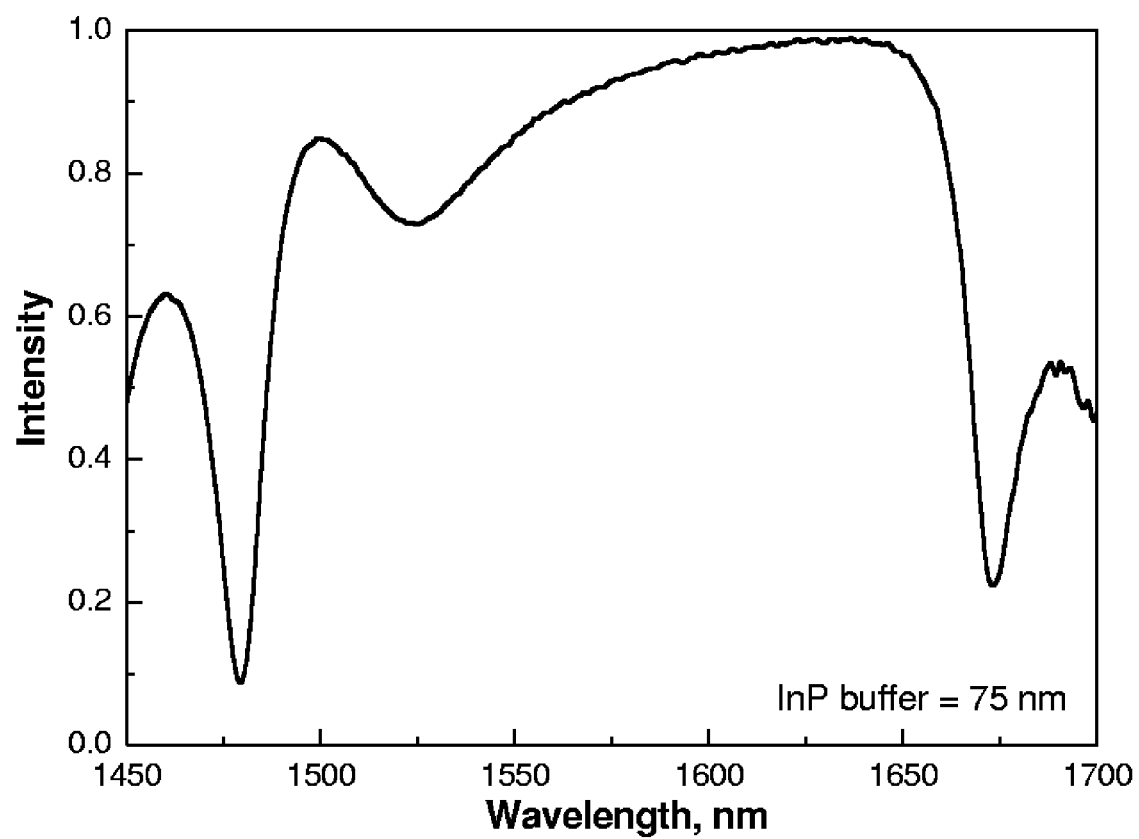
FIG. 3 shows the low intensity reflectivity spectrum of a SESAM designed according to this invention for applications within a wavelength range around 1550 nm.
Figure 4A:
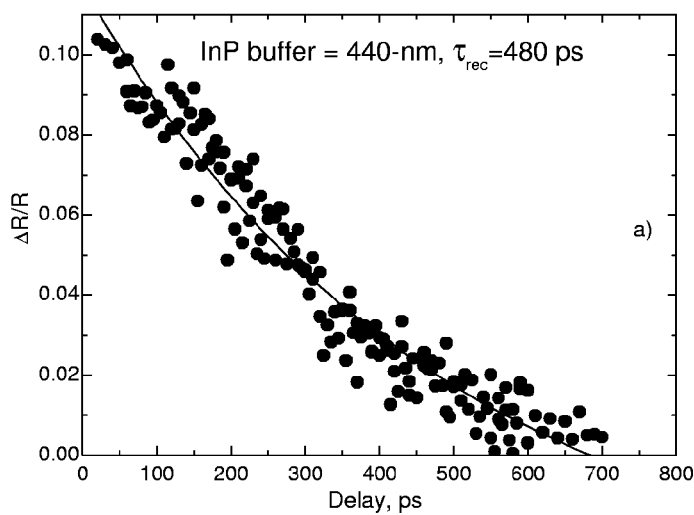
FIGS. 4a-4c depict the relation between the absorption recovery time and the thickness of the lattice reformation layer designed according to the first example embodiment of the invention.
Figure 4B:
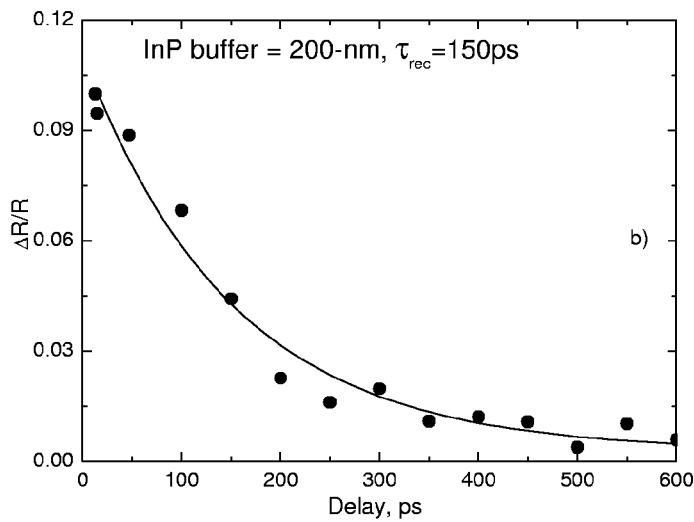
Figure 4C:
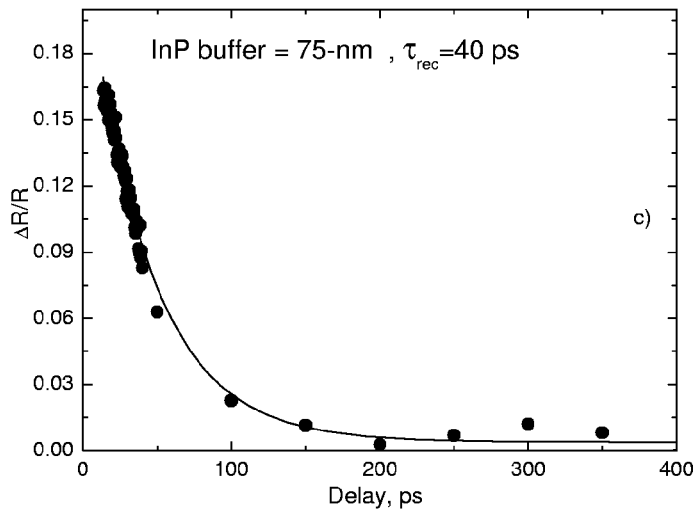

FIG. 2 shows an example embodiment of the invention describing the structure of a SESAM designed for operation at a wavelength around 1550 nm. The DBR 2 consists for example of 25 pairs of AlAs and GaAs with thicknesses of 134 nm and 115 nm, respectively, grown by molecular beam epitaxy at about 600° C. on n-GaAs (100) substrate. The lattice reformation layer 3 consists of InP. This layer is grown at a constant temperature, e.g. 500° C. optimized to allow penetration of the growth-related defects into the active region 4 grown afterwards. The thickness of the lattice reformation layer 3 i.e. the thickness of InP is an instrumental to optimize the SESAM performance; i.e. an increase of InP thickness results in an improvement of the crystalline quality of the active region 4 grown on the top of the lattice reformation layer 3. For example, to achieve recovery times suitable for mode-locking fiber laser, the InP should be about 75-200 nm thick. The active region 4 consists for example of five 11 nm thick $In_{0.53}Ga_{0.47}As$ quantum wells latticed matched to InP and separated by 8 nm thick InP barriers. The cap layer 5 consists of InP whose thickness can be used as an instrumental to change the resonant wavelength of the Fabry-Perot cavity formed between the DBR 2 and the surface of the device. As an example FIG. 3 presents low-intensity reflectivity curve from a SESAM designed according to this embodiment where the thicknesses of InP cap layer was set to 236 nm and the thickness of the lattice reformation layer 3 was 75 nm. Cross-sectional transmission electron microscope (TEM) studies revealed that for samples with a thickness of the InP buffer (the lattice reformation layer 3) in the range of 440 nm or higher the active region 4 was free of misfit and threading dislocations. For samples with a thickness of the InP buffer of about 200 nm TEM pictures showed that active region contained a significant number of crystalline defects. A high density of dislocations, distributed near uniformly over quantum-wells area has been observed for samples with 75 nm thick InP buffers. The effect of the thickness of InP-spacer layer on the absorption recovery was investigated by standard pump-probe measurements at a wavelength around the stop-band center of the DBR. The temporal decay of the absorption for samples with different thicknesses of the InP reformation layer is presented in FIGS. 4a, 4b and 4c, demonstrating a significant reduction in recovery time of SESAM reflectivity with a decrease in the thickness of InP buffer owing to higher density of carrier trapping centers present within the quantum wells. The recovery time constants derived from measurement using single-exponential fitting are 480 ps, 150 ps and 40 ps for samples with thicknesses of InP layer of 440 nm, 200 nm and 75 nm, respectively.

Figure 5:
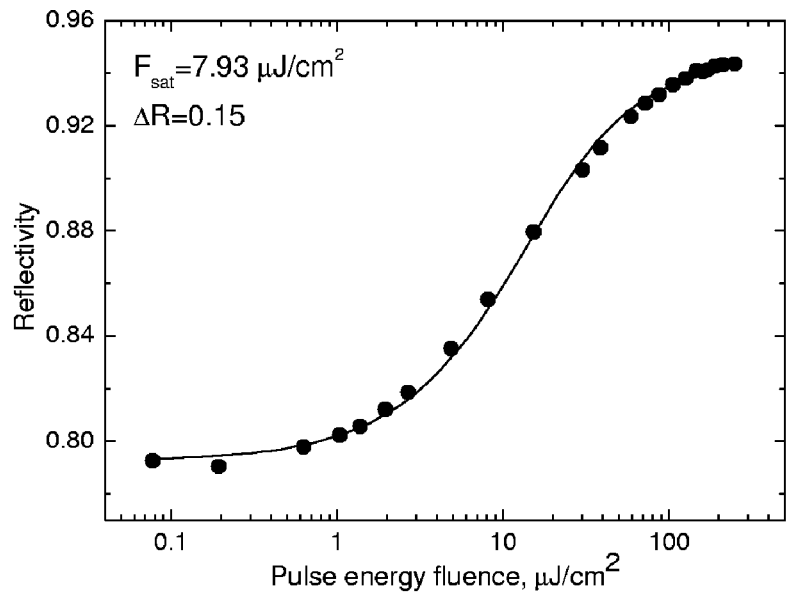
FIG. 5 depicts the nonlinear reflectivity variation of the SESAM presented in the first embodiment of the invention for a different thickness of the InP lattice reformation layer.

Despite reduction of the crystalline quality within the active region 4, samples with 75 nm thick InP buffer layers showed good values of the modulation depth, $\Delta R$ and saturation fluence, $F_{sat}$. The nonlinear reflectivity curve of such samples is presented in FIG. 5. The experimental data were fitted numerically using a two-level saturable absorption model. The numerical fit gives the modulation depth of $\Delta R=0.15$ and saturation fluence of $F_{sat}=7.93$ µJ/cm$^2$.

Figure 6:
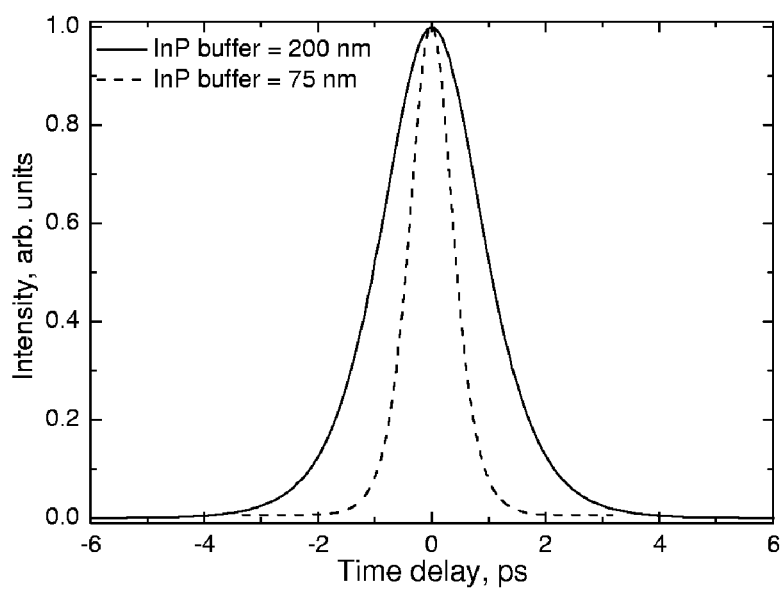
FIG. 6 Presents the autocorrelation traces of pulses emitted at the output of an Er-doped fibre laser passively mode-locked by a 1550 nm SESAM designed according to the first embodiment of the invention.

Sample fabricated according to this embodiment were tested in a linear cavity Ed-doped fiber laser to examine their ability to passively mode-lock. It was found that SESAM with the recovery time of 480 ps (InP buffer was 440 nm) could not passively mode-lock the laser. In contrary, SESAMs with InP buffer layers of ~200 and ~75 nm respectively provided a reliable self-starting mode-locking. SESAMs with recovery times below 150 ps provided a reliable self-starting mode-locked operation generating pedestal-free pulses, as shown in FIG. 6. It is also seen from this figure that faster recovery of the absorption provides shorter pulse durations.

Figure 7:
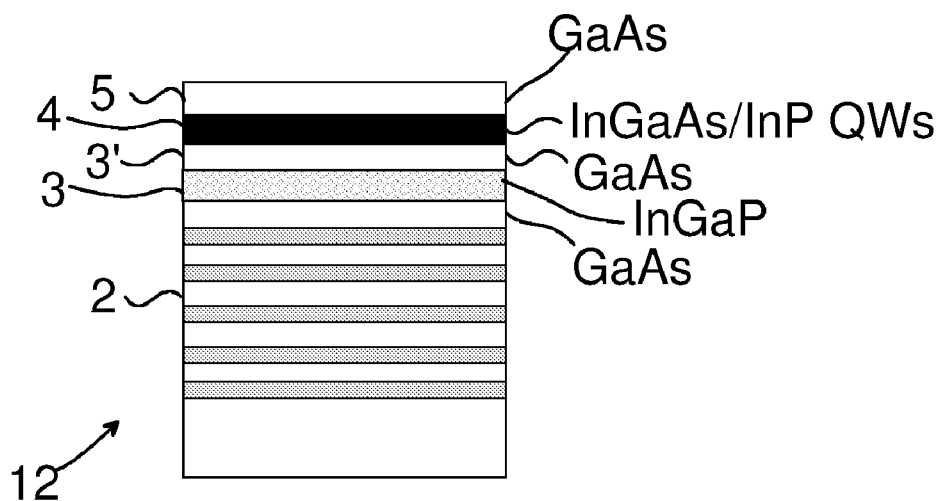
FIG. 7 is a cross-section of a semiconductor saturable absorber mirror described as a second embodiment of the invention, i.e. a SESAM to operate around 1040 nm wavelength range.
Figure 8:
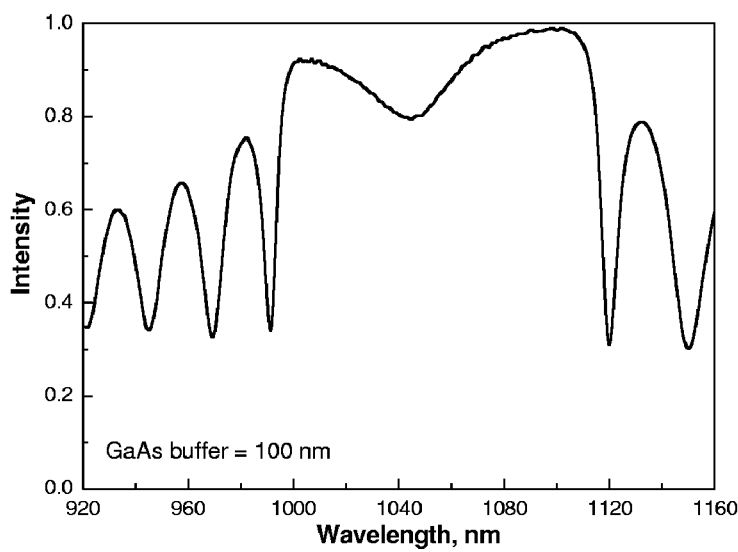
FIG. 8 shows an example of a low intensity reflectivity spectrum of a SESAM designed according to this invention for applications at 1040 nm.

Another exemplary embodiment of the invention, shown in FIG. 7, presents the structure of a SESAM operating in the wavelength range around 1060 nm. At this wavelength the lattice mismatched between InGaAs active region and GaAs is lower than for structures operating at 1550 nm. According to this embodiment the lattice reformation region comprises two parts: (i) a first layer, 3, of InGaP and (ii) a GaAs buffer, 3, between the InGaP layer and the active region. The purpose of InGaP is to introduce strain and allow creation of the defects within the active region. The GaAs buffer 3' serves as an instrumental to control the number of defects propagating into active region 4; i.e. the thicker the GaAs buffer layer 3' is, the smaller the amount of defects present within the active region is. For example, the thickness of the InGaP reformation layer can be ~80 nm while the thickness of GaAs buffer can range from few tens of nm to few hundreds of nm. The DBR 2 consists for example of 25 pairs of AlAs and GaAs with thicknesses of 90.2 nm and 76.4 nm, respectively. The active region 4 consists for example of few 7 nm thick $In_{0.31}Ga_{0.69}As$ quantum wells separated by 5 nm thick GaAs barriers. The cap layer 5 consists of GaAs. By changing the thickness of the cap layer 5 and/or lattice reformation layer 3, 3' one can adjust the resonant wavelength of the Fabry-Perot cavity formed between the DBR 2 and the surface of the device. FIG. 8 presents an exemplary low intensity reflectivity spectrum for a SESAM designed according to the present embodiment (InGaP buffer is 80 nm, GaAs buffer is 100 nm, GaAs cap is 30 nm and the active region 4 comprises seven quantum-wells). Several SESAM samples have been tested in mode-locked Yb-doped fiber lasers set-up to prove their ability to passively mode-lock a laser. It was experimentally proved that SESAMs comprising GaAs buffer reformation layers with a thickness of ~100 nm or less provide an efficient mode-locking mechanism leading to generation of transform limited ps pulses with tunable wavelength between 1035 to 1060 nm. On the other hand, devices with a thick GaAs buffer layer 3' (i.e. 400 nm or thicker) did not mode-lock the lasers.

As those skilled in the art could recognize, the design presented in this invention can be used to fabricate SESAMs operating at other wavelength domain. For example, by changing In composition within the active region, the previous exemplary embodiments can be readily applied for absorber operating at 920 nm and 1300 nm wavelength bands.

Additional optimization steps may also include rapid thermal annealing (RTA) for the purpose of improving the crystalline quality within the active region 4, and optimize SESAM properties.

Figure 9A:
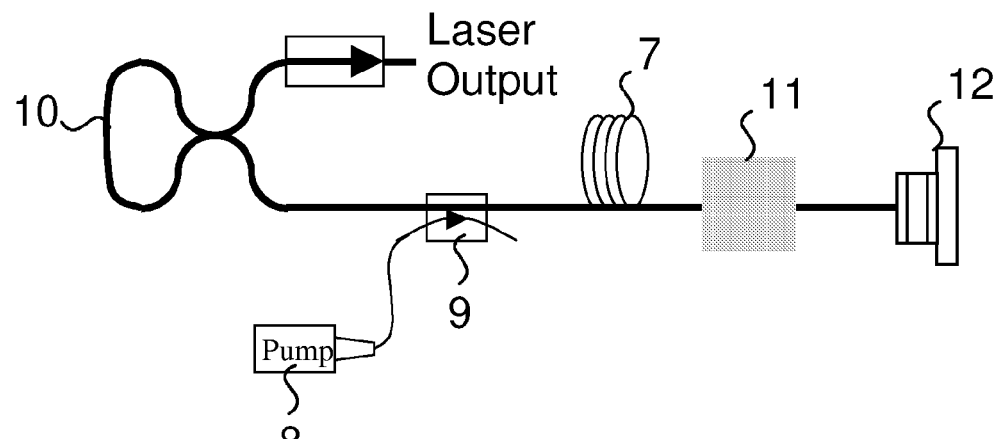
FIGS. 9a-9b Illustrates several embodiments of passively mode-locked fiber lasers employing a semiconductor saturable absorber fabricated according to this invention.
Figure 9B:
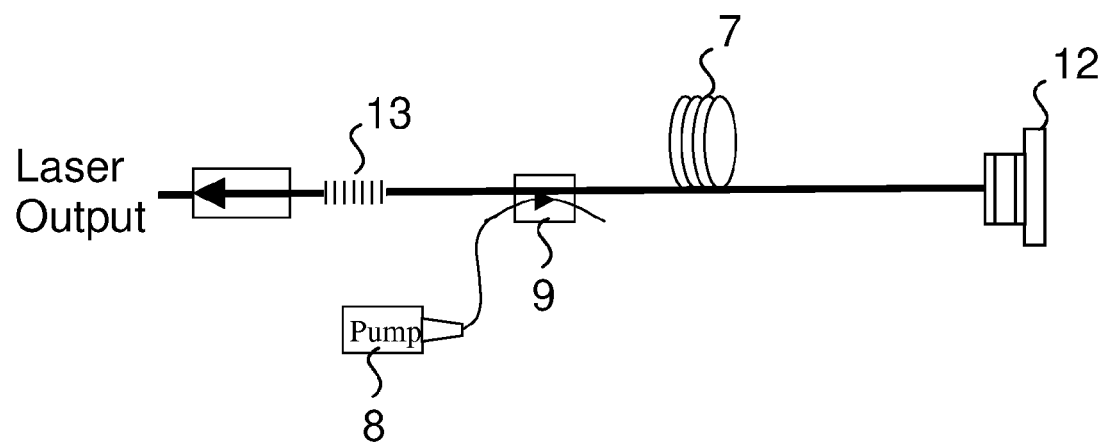

According to an application example revealed in FIGS. 9a and 9b a SESAM designed according to the present invention is used to passively mode-lock a fiber laser. Here the gain medium 7, for example Erbium Ytterbium doped fiber, is pumped optically to generate a signal beam. The pump 8 generates the pump signal which is coupled to the fiber by a coupling region 9. The laser cavity is defined by a SESAM at one side of the gain region and another mirror 10 or 11 at the other side of the gain region. The SESAM can be butt-coupled to the cavity or lens coupled. The laser cavity may employ dispersion compensators 13, including but not limited to grating pairs, prisms, specialty fiber such as dispersion compensation fiber and photonics band-gap fiber.

REFERENCES CITED

U.S. PATENT DOCUMENTS

| 5,627,854 | June 1997 | Knox | 372/99 |
| 4,860,296 | August 1989 | Chemla | 372/44 |
| 6,538,298 | March 2003 | Weingarten | 257/436 |
| 5,701,327 | December 1997 | Cunningham | 372/99 |

Other Publications

F. X. Kärtner et al., "Soliton mode-locking with saturable absorbers", IEEE J. Sel. Top. Quantum Electron., vol. 2, pp. 540-556, 1996.
B. C. Collings et al., "Short cavity Erbium/Ytterbium fiber laser mode-locked with a saturable Bragg reflector", IEEE J. Sel. Topics Quantum Electron, vol. 3, pp. 1065-1075, 1997.
J. F. Heffernan M. H. Moloney et al., "All optical, high contrast absorptive modulation in an asymmetric Fabry-Perot étalon", Appl. Phys. Lett., vol. 58, pp. 2877-2879, 1991.
M. Guina et al., "Harmonic mode-locking by synchronous optical pumping of a saturable absorber with the residual pump", Opt. Lett., 28, pp. 43-45, 2003.
S. Gray et al., "Soliton fiber laser with a hybrid saturable absorber", Opt. Lett., vol. 21, pp. 207-209, 1996.
R. Herda et al. "Effect of amplified spontaneous emission and absorber mirror recovery time on the dynamics of mode-locked fiber lasers", Appl. Phys. Lett., vol. 86, pp. 01111-1-01111-3, 2005.
S. Gupta et al., "Ultrafast carrier dynamics in III-V semiconductors grown by molecular-beam epitaxy at very low substrate temperatures", IEEE J. Select. Topics Quantum Electron., vol. 10, pp. 2464-2472, 1992.
L. Qian et al., "Subpicosecond carrier lifetime in beryllium-doped in InGaAsP grown by He-plasma-assisted molecular beam epitaxy", Appl. Phys. Lett., vol. 17, pp. 1513-1515, 1997.
J. T. Gopinath et al., "Ultrafast recovery time in implanted semiconductor saturable absorber mirrors at 1.5 μm", in Proc. CLEO, 2001 pp. 698-700.
E. Delpon et al., "Ultrafast excitonic saturable absorption in ion-implanted InGaAs/InAlAs multiple quantum wells", Appl. Phys. Lett., vol. 72, pp. 759-761, 1998.
G. Dentai et al., "MOVPE InGaAs/InP Growth Directly on GaAs Substrates", Electron. Lett. 22, 1186, 1986.
H. Q. Zheng et al., "Metamorphic InP-InGaAs double-heterojunction bipolar transistors on GaAs grown by molecular-beam-epitaxy", Appl. Phys. Lett., 77, pp. 869-871, 2000.

The invention claimed is:

1. A semiconductor device, comprising:
   a semiconductor substrate,
   a distributed Bragg reflector,
   an absorption region,
   a cap layer,
   a lattice reformation region between the distributed Bragg reflector and the absorption region, the lattice reformation region comprising InGaP and a GaAs buffer, the InGaP being between the GaAs buffer and the distributed Bragg reflector, the InGaP introducing strain and creating defects, while the GaAs buffer assists in controlling the number of defects that propagate to the absorption region.

2. The semiconductor device according to claim 1, wherein the distributed Bragg reflector is lattice matched to the semiconductor substrate.

3. The semiconductor device according to claim 1, wherein the absorption region comprises quantum-wells, quantum-dots or bulk semiconductor material.

4. The semiconductor device according to claim 1, wherein a lattice constant of the lattice reformation region is different from a lattice constant of the distributed Bragg reflector.

5. The semiconductor device according to claim 1, wherein the absorption region provides a nonlinear response to an incident signal beam.

6. The semiconductor device according to claim 1, wherein the distributed Bragg reflector comprises pairs of AlAs and GaAs or AlGaAs and GaAs.

7. The semiconductor device (12) according to claim 1, wherein the absorption region comprises $In_xGa_{1-x}As$.

8. The semiconductor device according to claim 1, wherein the GaAs buffer has a thickness of about 100 nm or less.

9. The semiconductor device according to claim 1, wherein the GaAs buffer has a thickness ranging from a few tens of nm to a few hundreds of nm.

10. The semiconductor device according to claim 1, wherein the absorption region comprises $In_xGa_{1-x}As$, with x about 0.31, and the Bragg reflector has a stop band centered around 1040 nm wavelength.

11. The semiconductor device according to claim 1, wherein the absorption region comprises $In_xGa_{1-x}As$, with x about 0.14, and the Bragg reflector has a stop band centered around 920 nm wavelength.

12. A laser comprising:
   a gain medium,
   a pump for pumping the gain medium, a mirror, and a semiconductor device, the semiconductor device having the structure as recited in claim 1.

13. The laser according to claim 12, wherein the mirror is an output port for the laser radiation generated within the laser.

14. A saturable absorber semiconductor mirror (SESAM) device, comprising:

a semiconductor substrate, a distributed Bragg reflector, a nonlinear absorption region, the distributed Bragg reflector being between the semiconductor substrate and the nonlinear absorption region, a lattice reformation region between the distributed Bragg reflector and the nonlinear absorption region, and wherein the nonlinear absorption region comprises $In_xGa_{1-x}As$, the lattice reformation region is about 75 nm-200 nm thick, and the SESAM device comprises a recovery timeat its operating wavelength, which the recovery time increases with increasing the thickness of the lattice reformation region.

15. The SESAM device of claim 14 wherein the lattice reformation region comprises InP.

16. The SESAM device of claim 14 wherein the lattice reformation region consists of a layer of InP that is grown at a constant temperature.

17. The SESAM device of claim 14 wherein the distributed Bragg reflector comprises GaAs.

18. The SESAM device of claim 14 including a surface forming with the distributed Bragg reflector a Fabry-Perot cavity having a resonant wavelength.

19. The SESAM device of claim 14 wherein said nonlinear absorption region comprises InP.

20. A semiconductor saturable absorber mirror (SESAM) device suitable for mode locking a laser, comprising:

a semiconductor substrate, a distributed Bragg reflector, a nonlinear absorption region, the distributed Bragg reflector being between the semiconductor substrate and the nonlinear absorption region, and a further region between said nonlinear absorption region and said distributed Bragg reflector, said further region comprising a lattice mismatched region configured to create defects for introduction into the nonlinear absorber region, and a buffer between the lattice mismatched region and the nonlinear absorber region, said buffer being configured to control the number of the defects that propagate into the nonlinear absorber region, including having a composition that is different than that of the lattice mismatched region.

21. The SESAM device of claim 20 wherein the distributed Bragg reflector comprises GaAs, the lattice mismatched region comprises InP, and the buffer comprises GaAs.

22. The SESAM device of claim 20 configured for operation in a wavelength range including 1060 nm.

23. The SESAM device of claim 20 configured for operation in a wavelength range including 1550 nm.

24. The SESAM device of claim 20 configured for operation in a wavelength range including 920 nm.

25. The SESAM device of claim 20 wherein the buffer has a thickness of about 100 nm or less.

26. A laser comprising: a gain medium, a pump for pumping the gain medium, a mirror, and a semiconductor device, the semiconductor device having the structure as recited in claim 14.

27. A laser comprising: a gain medium, a pump for pumping the gain medium, a mirror, and a semiconductor device, the semiconductor device having the structure as recited in claim 20.

* * * * *